Patented Jan. 20, 1942

2,270,292

UNITED STATES PATENT OFFICE 2,270,292

PROCESS FOR PRODUCING A MONO-HYDROCARBON ALUMINUM DIHALIDE

Aristid V. Grosse, Chicago, Ill., assignor to Universal Oil Products Company, Chicago, Ill., a corporation of Delaware No Drawing. Application March 21, 1938, Serial No. 197,236

6 Claims. (Cl. 260—448)

This invention relates particularly to the manufacture of catalysts useful in various types of organic reactions, particularly those involving different classes of hydrocarbons.

In a more specific sense the invention is concerned with a method of manufacture by which mono-hydrocarbon aluminum dihalides are producible which have a definite chemical composition as opposed to many of the previously reported complexes formed by the addition of metal halides to hydrocarbons.

It is well-known in hydrocarbon and other types of organic reactions that accelerated rates may be produced by the use of metal salts particularly halides such as aluminum chloride, ferric chloride, zinc chloride, tin chloride, etc. Aluminum chloride is for instance the essential catalyst in the reactions developed by Friedel and Crafts at an early date and zinc chloride is employed in many reactions involving the polymerization of hydrocarbons to form higher molecular weight polymers of similar chemical characteristics. In these general types of reactions the assumption is frequently made that the real catalysts are certain intermediate addition compounds such as, for example, $AlCl_3.C_6H_6$ or possibly $AlCl_2.C_6H_5$, as there has been some evidence of the existence of these intermediate compounds. However, few attempts have been made to isolate these assumed intermediate catalytic complexes or to prepare them by definite synthetic processes, and the present invention is concerned with a method whereby products of very definite composition may be produced in a state of comparative purity.

In one specific embodiment the present invention comprises the manufacture of compounds having the formulas $RAlX_2$ and $R_2AlX$ by reacting proportioned amounts of alkyl halides with metallic aluminum to form compounds of the general formula $AlR_3.AlX_3$ and then adding regulated amounts of compounds of the formulas $AlX_3$ or $AlR_3$ to produce the desired product. In the formulas given R may represent any alkyl or aryl group such as methyl, ethyl, phenyl, or tolyl groups and X may equal any one of the halogens selected from the group, chlorine, bromine, and iodine.

I have determined that when alkyl or aryl halides are mixed with metallic aluminum that high boiling oily liquids are formed which have the general formula $AlR_3.AlX_3$ and hence may be considered as mixtures of aluminum alkyls or aryls and aluminum halides. I have further determined by experiments that these compounds are really mixtures of compounds of the formulas $RAlX_2$ and $R_2AlX$ and if it is desired to produce the compounds of the formula $RAlX_2$ from these mixtures a regulated amount of aluminum halide may be added whereat the following type of equation takes place:

$$R_2AlX + AlX_3 \rightarrow 2RAlX_2$$

If it is desired to produce the di-alkyl or aryl aluminum monohalides, the mixtures may be converted by adding regulated amounts of aluminum tri-alkyls or aryls according to the following equation:

$$RAlX_2 + AlR_3 \rightarrow 2R_2AlX$$

The general steps in the manufacture of these compounds as already intimated are to react regulated amounts of alkyl or aryl halides and aluminum powder at ordinary or moderately elevated temperatures which are seldom in excess of 100° C. The primary reaction products are oily viscous materials which can be distilled under vacuum to separate unreacted materials and produce cuts which correspond closely to the primary formulas $AlR_3.AlX_3$. Analyses of more or less constant boiling fractions which were obtained in a number of cases showed that the amount of aluminum tri-halides or aluminum tri-alkyl or tri-aryl which is necessary to change the composition in the direction indicated can be computed and the reaction is commonly brought about by adding the aluminum compounds at temperatures of the order of 50–200° C. depending upon the particular types of compounds involved. For the final purification the method of crystallization from appropriate solvents of fractional distillation may be usually resorted to.

The compounds of the present character are in general spontaneously inflammable materials which must be handled with due caution to avoid contact with the atmosphere or with water. They have been found to be extremely active catalysts in various types of hydrocarbon reactions involving alkylation, polymerization, and isomerization when conditions of operation are properly regulated.

The following compounds have been prepared by the general procedure outlined and have all been found to have some definite catalytic activity which obviously will vary with the type of reaction in which they are employed and with the compounds themselves, not all of these materials being equally efficient on a given reaction and the effect of any one upon a given reaction not being entirely predictable.

Di-methyl aluminum chloride, $(CH_3)_2AlCl$
Di-methyl aluminum bromide, $(CH_3)_2AlBr$
Di-methyl aluminum iodide, $(CH_3)_2AlI$
Di-ethyl aluminum chloride, $(C_2H_5)_2AlCl$
Di-ethyl aluminum bromide, $(C_2H_5)_2AlBr$
Di-n-propyl aluminum iodide, $(n-C_3H_7)_2AlI$
Di-phenyl aluminum iodide, $(C_6H_5)_2AlI$
Di-p-tolyl aluminum iodide, $(CH_3.C_6H_4)_2AlI$ Methyl-aluminum di-chloride, $(CH_3)AlCl_2$
Methyl-aluminum di-bromide, $(CH_3)AlBr_2$
Methyl-aluminum di-iodide, $(CH_3)AlI_2$
Ethyl-aluminum di-chloride, $(C_2H_5)AlCl_2$
Ethyl-aluminum di-bromide, $(C_2H_5)AlBr_2$
n-Propyl-aluminum di-iodide, $n-C_3H_7AlI_2$
Phenyl-aluminum di-chloride, $C_6H_5AlCl_2$
Phenyl-aluminum di-bromide, $C_6H_5AlBr_2$
Phenyl-aluminum di-iodide, $C_6H_5AlI_2$
p-Tolyl-aluminum di-iodide, $CH_3C_6H_4AlI_2$ The following definite examples are given to show the preparation of compounds of the present character although the invention is not to be limited to the particular compounds whose preparation is thus described.

Example I

*Preparation of ethyl aluminum dichloride*

A certain fraction of ethyl aluminum chloride obtained by distilling the reaction product of ethyl chloride and aluminum was found by analysis to consist of diethyl aluminum chloride, 36.6% by weight, and ethyl aluminum dichloride, 63.4% by weight. To 57.6 grams of this liquid was added 22.8 grams of anhydrous aluminum chloride and the mixture was heated gradually to a temperature of 180–190° C. The aluminum chloride dissolved to give a clear colorless liquid which, on cooling to room temperature, deposited large, beautiful transparent plates. The liquid distilled chiefly at 114–116° C./50 mm. and the distillate reacted violently with water evolving ethane; 1.3805 grams of sample gave 243 cc. of gas under standard conditions; calcd. for $C_2H_5AlCl_2$ 244 cc. A sample crystallized from n-pentane melted at 32° C.

*Anal. calcd. for $C_2H_5AlCl_2$*

Al ............................................ 21.25
Cl ............................................ 55.86

*Anal. found for $C_2H_5AlCl_2$*

Al ............................................ 20.88
Cl ............................................ 55.81

Example II

*Preparation of phenyl aluminum di-iodide*

Phenyl iodide was allowed to react with aluminum at a temperature of 100° C. The viscous reaction product was filtered from the excess aluminum and unreacted phenyl iodide was removed by heating under reduced pressure. To 49.9 grams (corr. to 1 mol $(C_6H_5)_3Al_2I_3$) this material was added 30.5 grams (corr. to 1 mol $AlI_3$) of aluminum iodide. It was melted and heated on a boiling water bath for ½ hour. This product was dissolved in benzene, again filtered and allowed to crystallize, giving white prisms, m. p. 109°.

*Anal. calcd. for $C_6H_5AlI_2$*

Al ............................................ 7.54
I ............................................. 70.92

*Anal. found for $C_6H_5AlI_2$*

Al ............................................ 7.4
I ............................................. 71.3

I claim as my invention:

1. A process for producing a catalytic compound which comprises reacting a hydrocarbon halide with metallic aluminum thereby forming a di-hydrocarbon-aluminum-mono-halide, and reacting the last-named compound with a sufficient quantity of an aluminum tri-halide to convert it into a mono-organo-aluminum-di-halide, the halogen of said halides being selected from the group consisting of chlorine, bromine and iodine.

2. A process for producing a catalytic compound which comprises reacting an alkyl halide with metallic aluminum thereby forming a di-alkyl-aluminum-mono-halide, and reacting the last-named compound with a sufficient quantity of an aluminum tri-halide to convert it into a mono-alkyl-aluminum-di-halide, the halogen of said halides being selected from the group consisting of chlorine, bromine and iodine.

3. A process for producing a catalytic compound which comprises reacting an aryl halide with metallic aluminum thereby forming a di-aryl-aluminum-mono-halide, and reacting the last-named compound with a sufficient quantity of an aluminum tri-halide to convert it into a mono-aryl-aluminum-di-halide, the halogen of said halides being selected from the group consisting of chlorine, bromine and iodine.

4. The process as defined in claim 1 further characterized in that the first-mentioned reaction is performed at a temperature not substantially in excess of 100° C. and the second-mentioned reaction at a temperature of 50–200° C.

5. The process as defined in claim 2 further characterized in that the first-mentioned reaction is performed at a temperature not substantially in excess of 100° C. and the second-mentioned reaction at a temperature of 50–200° C.

6. The process as defined in claim 3 further characterized in that the first-mentioned reaction is performed at a temperature not substantially in excess of 100° C. and the second-mentioned reaction at a temperature of 50–200° C.

ARISTID V. GROSSE.